(12) United States Patent
Bankston et al.

(10) Patent No.: US 11,997,103 B2
(45) Date of Patent: May 28, 2024

(54) GRADUATED ACCOUNTS USING ASSERTIONS

(71) Applicant: Visa International Service Association, San Francisco, CA (US)

(72) Inventors: Michael Steven Bankston, Oakland, CA (US); Erik Christopher Friend, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 505 days.

(21) Appl. No.: 16/777,422

(22) Filed: Jan. 30, 2020

(65) Prior Publication Data

US 2020/0252408 A1    Aug. 6, 2020

Related U.S. Application Data

(60) Provisional application No. 62/799,629, filed on Jan. 31, 2019.

(51) Int. Cl.
*H04L 9/40* (2022.01)
*G06F 21/62* (2013.01)
*G06Q 40/02* (2023.01)

(52) U.S. Cl.
CPC ........ *H04L 63/105* (2013.01); *G06F 21/6254* (2013.01); *G06Q 40/02* (2013.01)

(58) Field of Classification Search
CPC ............... H04L 63/105; H04L 63/0407; H04L 63/0892; G06F 21/6254; G06Q 40/02
See application file for complete search history.

(56) References Cited

U.S. PATENT DOCUMENTS

| | | | |
|---|---|---|---|
| 9,338,658 B1* | 5/2016 | Gailloux | H04W 12/12 |
| 10,009,337 B1* | 6/2018 | Fischer | H04L 67/1097 |
| 10,038,692 B2* | 7/2018 | Choyi | H04L 63/08 |
| 10,375,177 B1* | 8/2019 | Bretan | H04L 67/146 |
| 10,685,131 B1* | 6/2020 | Lunsford | G06F 21/316 |
| 11,093,912 B1* | 8/2021 | Fakhraie | H04L 63/0853 |
| 2004/0128393 A1* | 7/2004 | Blakley, III | H04L 63/0807 709/229 |
| 2012/0110651 A1* | 5/2012 | Van Biljon | G06F 21/6218 709/201 |
| 2013/0139224 A1* | 5/2013 | Wehmeier | G06F 21/552 726/4 |

(Continued)

OTHER PUBLICATIONS

Hardjono et al., "Trust::Data: A New Framework for Identity and Data Sharing", Visionary Future LLC., pp. 1-48.

(Continued)

*Primary Examiner* — Han Yang
*Assistant Examiner* — Andrew Suh
(74) *Attorney, Agent, or Firm* — Kilpatrick Townsend & Stockton LLP

(57) ABSTRACT

A system and method are provided which include receiving, by a server computer from a trusted entity computer, user data corresponding to a user. Based on the user data, the server computer determines a set of assertions for the user. The server computer receives, from a relying entity, an assertion request for the user. Responsive to the assertion request, the server computer provides, to the relying entity, an assertion, of the set of assertions. The relying entity thereby grants the user a particular type of account based on the assertion.

11 Claims, 8 Drawing Sheets

(56) References Cited

U.S. PATENT DOCUMENTS

| | | | | |
|---|---|---|---|---|
| 2014/0278991 | A1* | 9/2014 | Sandoval | G06Q 30/0257 705/14.55 |
| 2016/0294879 | A1 | 10/2016 | Kirsch | |
| 2017/0250972 | A1* | 8/2017 | Ronda | H04L 9/0891 |
| 2017/0316322 | A1* | 11/2017 | Perincherry | G06Q 10/1093 |
| 2018/0183802 | A1* | 6/2018 | Choyi | H04L 63/105 |
| 2018/0254907 | A1 | 9/2018 | Gasparini | |

OTHER PUBLICATIONS

The Global Identity Foundation, "Global Identity—Challenges, pitfalls and solutions" Version 1, Oct. 2013, 25 pages.

OECD (2011), "National Strategies and Policies for Digital Identity Management in OECD Countries", OECD Digital Economy Papers, No. 177, OECD Publishing, Paris, 90 pages.

OECD, "Working Party on Security and Privacy in the Digital Economy," Developments in Digital Identity, 23 pages.

OECD, "Digital Identity Management—Enabling Innovation and Trust in the Internet Economy," 183 pages.

McWaters, Jesse et al., "A Blueprint for Digital Identity—The role of Financial Institutions in Building Digital Identity", World Economic Forum, Aug. 2016, 108 pages.

Schneider, Fredrich, "The Shadow Economy in Europe", AT Kearney, 20 pages.

"Identity Assurance Principles—Privacy and Consumer Advisory Group (PCAG)" V3.1, 12 pages.

Tsys, "2016 U.S. Consumer Payment Study", 36 pages.

"FAQs: Final CIP Rule", CIP-FAQ-RA2005-05Encl.pdf, 14 pages.

Souppaya, Murugiah et al., "Derived Personal Identity Verification (PIV) Credentials", National Institut of Standards and Technology, Jun. 18, 2015, 21 pages.

Tuefel III, Hugo, "Privacy Policy Guidance Memorandum", Memorandum No. 2008-01, U.S. Department of Homeland Security, 4 pages.

"National Strategy for Trusted Identities in Cyberspace—Enhancing Online Choice, Efficiency, Security, and Privacy", Apr. 2011, 52 pages.

Karadi, Gouthum, "The Distributed Internet: Blockchain Information Sharing and Privacy", BlockchainForPII.pdf, 12 pages.

Friese, Ingo, "Identity and Privacy Architecture Viewpoint for IoT systems", Version 1.0, 12 pages.

Unique Identification Authority of India, Government of India, "About Aadhaar", Nov. 26, 2018, uidai.gov.in/your-aadhaar/about-aadhaar.html, 1 page.

"Device Identity Management Needed Solutions for Device Identification", https://www.digicert.com/iot/device-identity-management.htm, 3 pages.

"Concepts of Identity within the Internet of Things", https://kantarainitiative.org/confluence/display/IDoT/Concepts+of+Identity+within+the+Internet+of+Things, 11 pages.

"Systems and software engineering—Architecture description", http://www.iso-architecture.org/ieee-1471/, Accessed Nov. 27, 2018, 8 pages.

"Gartner Says Managing Identities and Access Will Be Critical to the Success of the Internet of Things", http://www.gartner.com/newsroom/id/2985717, Feb. 17, 2015, 4 pages.

IoT Working Group, "Identity and Access Management for the Internet of Things—Summary Guidance", Cloud Security Alliance, 15 pages.

Yurcan, Brian, "Why banks should consider taking a page from Facebook on security keys", American Banker, published Jan. 26, 2017, https://www.americanbanker.com/news/why-banks-should-consider-taking-a-page-fromfacebook-on-security-keys, 4 pages.

Crosman, Penny, "Sorting out the authentication mess for omnichannel banking", American Banker, Published Jan. 12, 2017, https://www.americanbanker.com/news/sorting-out-the-authentication-mess-foromnichannel-Banking, 6 pages.

Hochstein, Marc, "Wells Fargo Fiasco Lays Bare a Broken Identity System", American Banker, published Oct. 20, 2016, https://www.americanbanker.com/opinion/wells-fargo-fiasco-lays-bare-a-broken-identitysystem, 4 pages.

Berry, Kate, "Calif. AG Investigates Wells Fargo for Criminal Identity Theft", American Banker, published Oct. 19, 2016, https://www.americanbanker.com/news/calif-ag-investigates-wells-fargo-for-criminal-identitytheft, 3 pages.

Crosman, published, "Which Identity Proof Works Best?", American Banker, Aug. 2, 2016, https://www.americanbanker.com/news/which-identity-proof-works-best, 6 pages.

Macheel, Tanaya, "Identity Startup Builds Trust Network to Devalue Stolen Data", American Banker, published Jul. 19, 2016, https://www.americanbanker.com/news/identity-startup-builds-trust-network-to-devaluestolen-data, 3 pages.

Macheel, Tanaya, "Santander Group Backs N.Y. Digital Identity Startup", American Banker, published on Jun. 22, 2016, https://www.americanbanker.com/news/santander-group-backs-ny-digital-identity-startup, 2 pages.

Crosman, Penny, "What Can Banks Offer in the Debate Over Digital Identity?", American Banker, published Jun. 21, 2016, https://www.americanbanker.com/news/what-can-banks-offer-in-the-debate-over-digitalidentity, 5 pages.

McKendry, Ian, "Small businesses need tougher cyber regs, CU executive says", American Banker, published Mar. 8, 2017, https://www.americanbanker.com/news/small-businesses-need-tougher-cyber-reqs-cuexecutive-says, 4 pages.

Crosman, Penny, "Identity Fraud: Back with a Vengeance, Harder to Stop", American Banker, published Jun. 9, 2016, https://www.americanbanker.com/news/identity-fraud-back-with-a-vengeance-harder-to-stop, 7 pages.

Yurcan, Bryan, "How BBVA Is Tackling Digital Identity", American Banker, published Mar. 27, 2016, https://www.americanbanker.com/news/how-bbva-is-tackling-digital-identity, 3 pages.

Macheel, Tanaya, "Airbnb Hires a Blockchain Team in Possible Identity Play", American Banker, published Apr. 13, 2016, https://www.americanbanker.com/news/airbnb-hires-a-blockchain-team-in-possible-identityplay, 2 pages.

Adams, John, "Fed Addresses the Faster Payments Identity Crisis", American Banker, published Feb. 2, 2016, https://www.americanbanker.com/news/fed-addresses-the-faster-payments-identity-crisis, 4 pages.

Yurcan, Bryan, "How Blockchain Fits into the Future of Digital Identity", American Banker, published Apr. 8, 2016, https://www.americanbanker.com/news/how-blockchain-fits-into-the-future-of-digital-identity, 6 pages.

"Digital Identity Players to Watch", American Banker, published Mar. 27, 2016, https://www.americanbanker.com/slideshow/digital-identity-players-to-watch, 8 pages.

Yurcan, Bryan, "The Future of Digital Identity Is Up to Banks", American Banker, published Mar. 27, 2016, https://www.americanbanker.com/news/the-future-of-digital-identity-is-up-to-banks, 11 pages.

Passy, Jacob, "Avoka, Trulioo Partner on Digital Identity Verification", American Banker, Published Nov. 3, 2015, https://www.americanbanker.com/news/avoka-trulioo-partner-on-digital-identity-verification, 1 page.

Waggoner, Darren, "Louisiana Man Allegedly Stole $5M, 300 Identities", American Banker, published Sep. 24, 2015, https://www.americanbanker.com/news/louisiana-man-allegedly-stole-5m-300-identities, 2 pages.

Crosman, Penny, "Identity Is Broken—Can Banks Fix It?", American Banker, published Apr. 29, 2015, https://www.americanbanker.com/news/identity-is-broken-can-banks-fix-it, 7 pages.

* cited by examiner

For each Underlying Assertion:
{
Assertion Name ::= This assertion's descriptor
Assertion ID ::= 1-N
Assertion Type ::= [Binary, Link, Index]
Assertion Date Scope ::= "StartDate=DateTimeStamp", ["EndDate=DateTimeStamp", "EndDate=None", "HalfLife=DateTimeStamp"]
Assertion Value ::= This assertion's value, e.g. (Binary::={"Yes", "No"}), ("URL..."::={...}, ("Distributed Ledger Link"::={}),...
Assertion Source ::= Assertion's source document [
Assertion Trust Score ::= (1,...,5)
Assertion Entity signature ::= Digital signature of the Entity of which this assertion is true
Assertion Trusted Authority ID ::= Digital signature of the Trusted Entity signing this assertion (TAID)
Assertion Updater ID ::= Digital signature of the Entity physically issuing this assertion, which might not equal the TAID
Assertion Model ID ::= Current Assertion model's index
}

FIG. 6

700

For all Underlying Assertions in this set:

Assertion Model ID ::= This Model's index
Assertion Model Name ::= This Model's descriptor
Assertion Model Descriptor ::= This model's descriptive text
Assertion Model Date ::= Assertion Model
Assertion Trusted Authority ID ::= Trusted Entity signing this assertion (TAID)
Assertion Updater ID ::= Entity physically making this assertion (may be <> TAID)
Assertion Valid Sources ::= [list of valid assertion sources, e.g. ("Passport", Country of origin), ("Driver's License", Country, Province), ("Trusted Entity", Trusted Entitly eIDAS-compliant eSignatures), ....]

Assertion Scoring Link ::= Function URL for scoring assertions, e.g. NIST algorithm.

FIG. 7

For each Clustered Assertion:
{
  Package Name ::= This assertion's descriptor
  Package ID ::= 1-N
  Package Date Scope ::= "StartDate=DateTimeStamp", ["EndDate=DateTimeStamp", "EndDate=None", "HalfLife=DateTimeStamp"]
  {
    Assertion Name ::= This assertion's descriptor
    Assertion Trust Score ::= (1,...,5)
  },...
  Assertion Model ID ::= Current Assertion model's index
}

GRADUATED ACCOUNTS USING ASSERTIONS

CROSS-REFERENCE TO RELATED APPLICATION

This application is a nonprovisional application, which claims priority to U.S. Provisional Application No. 62/799,629, filed on Jan. 31, 2019, which is herein incorporated by reference in its entirety.

BACKGROUND

An individual may be granted, or not granted, a particular type of account based on information about that individual. For some types of accounts, a great deal of information may be required to determine whether the account should be granted. For example, a person applying for a new bank account or line of credit may be subject to a screening of prior financial interactions. Problems may arise for individuals with limited data available. For example, if someone has never had a bank account, it may become difficult to determine whether an account should be granted to that individual. This can create barriers to individuals attempting to access such resources initially.

Typically, when determining whether to grant an account to an individual, an entity will undergo know your customer (KYC) screening. KYC involves verifying the identity of an individual and evaluating the risks of entering into a relationship with the individual. This typically requires collection and analysis of personally identifiable information about the user. Collecting and analyzing personally identifiable information often requires a great deal of time, processing power, and money, in order to acquire the necessary data from various sources. Further, as privacy becomes increasingly important, individuals prefer to limit such accumulation of personally identifiable information.

BRIEF SUMMARY

The methods described herein provide a way to grant accounts to users based on graduated account levels determined using assertions about the individual.

Embodiments include a method comprising: receiving, by a server computer from a trusted entity computer, user data corresponding to a user; based on the user data, determining, by the server computer, a set of assertions for the user; receiving, by the server computer from a relying entity, an assertion request for the user; and responsive to the assertion request, providing, by the server computer to the relying entity, an assertion, of the set of assertions, wherein the relying entity thereby grants the user a particular type of account based on the assertion.

In some aspects, the assertions do not include personally identifiable information about the user. In some aspects, the provided assertion specifies the particular type of account.

In some aspects, the user data is first user data, the assertion request is a first assertion request, and the particular type of account is a first type of account, the method further comprising: receiving, by the server computer from the trusted entity computer, second user data corresponding to the user; based on the second user data, updating, by the server computer, the set of assertions for the user to generate an updated set of assertions for the user; receiving, by the server computer from the relying entity, a second assertion request for the user; and responsive to the second assertion request, providing, by the server computer, an updated assertion, of the updated set of assertions, wherein the relying entity thereby grants the user a second type of account based on the updated assertion. In some aspects, prior to transmitting the user data to the server computer, the trusted entity computer receives user permission to share the user data responsive to a request to share the user data.

In some aspects, the assertion request is a first assertion request and the particular type of account is a first type of account, the method further comprising: receiving, by the server computer from the relying entity, a second assertion request for the user; and responsive to the second assertion request, providing, by the server computer, the assertion, wherein the relying entity thereby refuses the user a second type of account based on the assertion.

Embodiments include a server computer comprising a processor; and a computer readable medium, operatively coupled to the processor, for performing any of the above methods.

Embodiments include a method comprising: receiving, by a relying entity computer from a user, a request for a particular type of account; transmitting, by the relying entity computer to a server computer, an assertion request for the user; receiving, by the relying entity computer from the server computer, an assertion, wherein the assertion is based on user data corresponding to the user; and granting, by the relying entity computer to the user, the particular type of account based on the received assertion.

In some aspects, the assertion request is a first assertion request, and the particular type of account is a first type of account, the method further comprising: transmitting, by the relying entity computer to the server computer, a second assertion request for the user; responsive to the second assertion request, receiving, by relying entity computer from the server computer, an updated assertion, of the updated set of assertions; and granting, by the relying entity computer to the user, a second type of account based on the updated assertion. In some aspects, the first type of account is subject to more restrictions than the second type of account.

In some aspects, the assertion request is a first assertion request and the particular type of account is a first type of account, the method further comprising: transmitting, by the relying entity computer to the server computer, a second assertion request for the user; responsive to the second assertion request, receiving, by relying entity computer from the server computer, the assertion; and refusing, by the relying entity computer to the user, a second type of account based on the assertion.

BRIEF DESCRIPTION OF THE DRAWINGS

FIGS. 6-8 illustrate examples of information contained in data packages sent with assertions, according to some embodiments.

Figure 1:
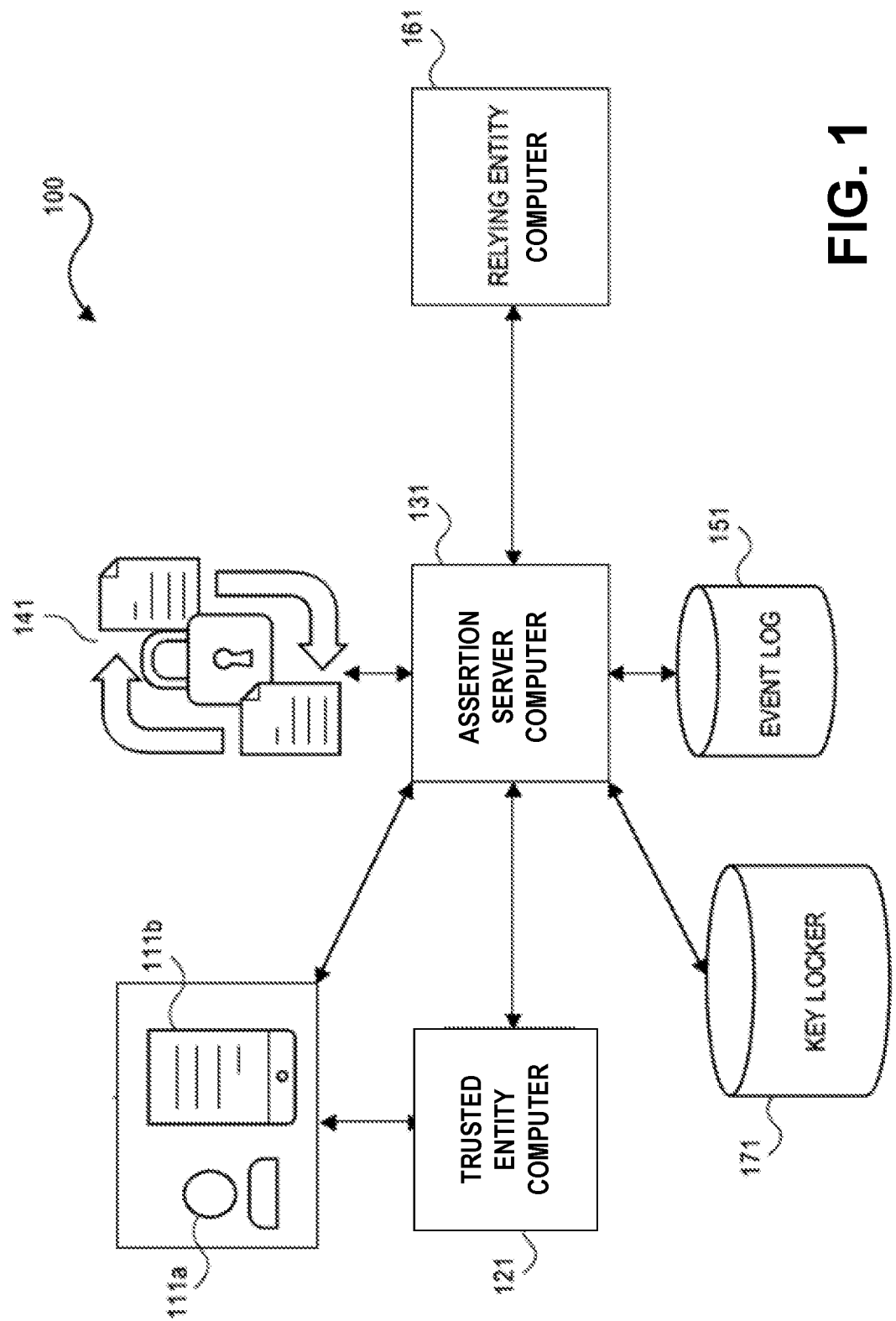
FIG. 1 shows a block diagram of a system for managing graduated accounts according to some embodiments.

While each of the figures illustrates a particular embodiment for purposes of illustrating a clear example, other embodiments may omit, add to, reorder, and/or modify any of the elements shown in the figures.

DETAILED DESCRIPTION

Embodiments can provide for systems and methods for managing access to accounts using assertions. In some embodiments, the assertions specify whether a user should be granted a particular account. In some embodiments, the accounts are organized into levels associated with the assertions. The account levels can provide a ladder of financial inclusion allowing unbanked individuals to build credit history.

In some embodiments, assertions may be used to provide information about a user, while protecting personally identifiable user data. In some embodiments, assertions can be used to provide certain information that is relevant to a determination whether to grant a particular account to a user without disclosing the underlying information in the user data. For example, an assertion such as "person X is over 21 years old" provides sufficient information to a bar owner that person X is old enough to drink alcohol, but does not disclose person X's specific age. Person X's specific age would be person X's specific user data.

In some embodiments, account levels may be established to control access to different types of accounts. The account levels may increase with the amount and/or quality of data gathered in association with the user. For example, account levels may be used to control user eligibility for an entry account, a full account, and/or credit or financial services. This may allow a user graduated access to accounts, which can be useful, for example, for users with little data available initially. The user may be able to work their way up to full account access as additional user data is gathered.

Prior to discussing various embodiments, some terms can be described in further detail.

The term "identifier" may refer to any information that may be used to identify something. In some embodiments, the identifier may be a special value generated randomly or according to a predetermined algorithm, code, or shared secret. For example, an individual may be identified using a driver's license number or a cryptographic key. In some embodiments, the identifier may be in the form of one or more graphics, a token, a bar code, a quick response (QR) code, or any other information that may be used to uniquely identify an entity.

A "digital identity" (DI) may include a secure set of information about an entity (e.g., a person, organization, or thing). A DI may comprise a plurality of identity attributes, as well as a digital identity identifier that identifies the digital identity. For example, a DI for a user, Joe Smith, may include identity attributes such as the user's date of birth, social security number, address, and driver's license number, as well as an identifier such as Joe_Smith_1234 which is used to identify Joe Smith's digital identity. The DI may be made available to another entity in a secure manner. DIs may rely on agreements among stakeholders and security measures such as cryptography.

An "assertion" (sometimes referred to as an "assertion value") may refer to a secure fact about an entity. An assertion can protect information while being useful to achieve a particular goal. For example, an assertion may specify something about an entity, such as whether the entity should be allowed to purchase alcohol in a particular location. The assertion may be "Jane Doe is old enough to purchase alcohol in California." This assertion can be used by a bar in its decision to serve alcohol to a person, instead of conveying the person's driver's license information to the bar. As another example, an assertion may specify whether an entity has an account which can accept deposits (e.g., "Jane Doe has a bank account and can accept deposits.").

A "type of assertion" may be a category of assertions, e.g., whether an entity has at least $100 in a bank account. The "assertion" or "assertion value" associated with the type of assertion may be a corresponding answer for a particular entity, which may in the form of "yes" or "no," or may be an affirmative statement (e.g., "Jane Doe has $100 or more in her bank account."). An assertion may be secured cryptographically. An assertion may be digitally signed by the entity of interest and/or the trusted party providing the secure facts. In some embodiments, an assertion may be digitally signed by an entity of interest and/or a trusted party providing the secure facts.

An "assertions model" may be a set of assertion types that may be associated with a particular entity. An assertions model may specify one or more types of assertions. For example, an assertions model may include two types of assertions: whether an entity is old enough to rent a car and whether the entity has a valid driver's license. An assertions model may be tailored to a particular situation. Continuing with the previous example, whether an entity is old enough to rent a car and whether the entity has a valid driver's license may correspond to an assertions model for the context of a prospective car renter interacting with a rental car agency.

A "user" may include an individual. In some embodiments, a user may be associated with one or more personal accounts and/or user devices. The user may also be referred to as a cardholder, account holder, or consumer in some embodiments. The user may have a digital identity.

A "user device" may be any suitable electronic device that can process and communicate information to other electronic devices. A user device according to embodiments may include a processor and a computer-readable medium coupled to the processor. The computer-readable medium may comprise code, executable by the processor. The user device may also each include an external communication interface for communicating with each other and other entities. Examples of user devices may include a mobile device, a laptop or desktop computer, a wearable device, etc.

"User data" may refer to information about a user. Examples of user data include a driver's license number, a bank account number, a record of past transactions made at a particular merchant, and a record of visits to a particular location. In some embodiments, user data may be personal data about a user, such as a driver's license number, a bank account number, that is provided by an authority (e.g., a bank, a government agency). Identity attributes may be other examples of user data, and this user data may make up a digital identity of the user. In some embodiments, user data may be generated based on actions of the user, such as a location event when a user enters a merchant's store. In embodiments, user data may be stored in encrypted form in one or more databases.

A "relying entity" may refer to an entity that may receive an assertion, DI, and/or user data. For example, the relying entity may be a creditor that requests an assertion whether a target entity has credit history.

A "relying entity computer" may include a device that requests data about a user. Examples of relying entity computers may include an issuer computer requesting information (e.g., past locations and transactions) about a user in order to track purchasing habits. Relying entity computers may transmit an "assertion request" to a computer such as an assertions platform server computer.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer-readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. In some embodiments, a key may refer to a database index as part of a key-value pair.

A "distributed ledger" may refer to a database that is shared among multiple nodes across a network. Entities corresponding to each node may store identical copies of the ledger at a given time. The entities may have permission to make changes or additions to the ledger. When the ledger is changed, the participating entities may receive the updated ledger. Examples of distributed ledgers include a blockchain, wherein transactions are verified before being encrypted and recorded to the ledger in a block of transactions.

FIG. 1 illustrates a schematic diagram of an example system 100 for graduated account management according to some embodiments. System 100 illustrates only one of many possible arrangements of components configured to execute the programming described herein. Other arrangements may include fewer or different components, and the division of work between the components may vary depending on the arrangement.

The system 100 can include at least one trusted entity computer 121, an assertion server computer 131, a relying entity computer 161, a ledger of assertions 141, an event log 151, a user 111a, a user device 111b, and a key locker 171.

The components of the system 100 may be in operative communication with each other through a communication network. The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 4 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

For simplicity of illustration, a certain number of components are shown in FIG. 1. It is understood, however, that embodiments may include more than one of each component. For example, there can be a plurality of user devices, including first user device 111b, in operative communication with the trusted entity computer 121 and/or the assertion server computer 131.

The user 111a is an individual that wishes to establish an account (e.g., a bank account, a loyalty account, an email account, an account with a service provider such as a cable company), and so forth. In some embodiments, the user 111a has a limited history of related accounts. For example, the user 111a may be an unbanked person that has never had a bank account.

In some non-limiting embodiments, the user 111a may be assigned an identifier ("an identifier of the user"). The identifier of the user 111a may include data associated with a digital signature and/or cryptographic key of the user 111a. Alternatively, or additionally, the identifier of the user 111a may include an ID number, a Quick Response (QR) code, and/or the like.

The user device 111b is a device operated by the user 111a, such as a mobile phone, tablet, computer, or the like. The user device 111b may include one or more applications. Such applications may be associated with the trusted entity computer 121 and/or the relying entity computer 161. For example, the user device 111b may include a banking application associated with the relying entity computer 161.

Trusted entity computer 121 is a computer that gathers user data associated with user 111a. For example, the trusted entity computer 121 may receive information as to whether user 111a has maintained an account in good standing, made payments to an account, and so forth. The trusted entity computer 121 may work in coordination with the server computer to obtain user 111a permissions for acquiring and sharing such user data. The trusted entity computer 121 may collect and store user data. The trusted entity computer may transmit user data to the assertion server computer 131.

In some embodiments, trusted entity computer 121 may correspond to a Mobile Network Operator (MNO). A MNO may provide mobile device services to a user such as phone and internet service. This may result in collection of various types of user data. User data collected by a MNO may include data related to the user's mobile phone account, such as how long the user has had the account, the user's payment history in association with the account, location data, etc. In some cases, MNOs also operate mobile payment services. MNO payment services may be used for micropayments (relatively small, digital payments). If the trusted entity computer 121 corresponds to an MNO payment service, then the trusted entity computer 121 may further gather and store user data related to payments made and transaction history. As other examples, trusted entity computer 121 may be associated with a utility company, a merchant (e.g., for data associated with payments on a lease or installment plan), a government entity (e.g., for data associated with car registration or tax payments), or a bank.

In some embodiments, multiple trusted entity computers 121 of different types are communicatively coupled to the assertion server computer 131. Various types of trusted entity computers 121 may be part of the system and collect user data (e.g., an MNO, a utility company, and a library). Accordingly, the assertion server computer 131 may generate assertions for users based on user data collected from various sources.

In some embodiments, the assertion server computer 131 (also referred to herein as a server computer) manages, generates, and provides assertions about users. An assertion server computer 200 such as assertion server computer 131 is described in detail below with respect to FIG. 2.

In some non-limiting embodiments, the relying entity computer 161 is an entity to receive information associated with a user 111a. The relying entity computer 161 can be a computer associated with an entity that grants and manages accounts. For example, the relying entity computer 161 may be a computer of a bank that manages different types of accounts such as a limited checking account, a full checking account, and various credit accounts. As another example, the relying entity computer 161 may be associated with a library that maintains different account levels, where users can borrow different amounts of items for different amounts of time based on the account level. The relying entity computer 161 may request information about the user 111a. For example, the relying entity computer 161 can be a bank requesting information about a user 111a attempting to open a new account.

In some non-limiting embodiments, the relying entity computer 161 may be assigned an identifier ("an identifier of the relying entity"). The identifier of the relying entity may include data associated with a digital signature and/or cryptographic key of the relying entity computer 161.

The ledger of assertions 141 may be a file, a collection of files, or a database for storing assertions data. The ledger of assertions 141 may be a distributed ledger. The ledger of assertions, may for example, be implemented as an Ethereum blockchain, which is supported by the Ethereum Foundation (https://www.ethereum.org/). As another example, a Hyperledger may be used, which is an open-source Linux Foundation project (https://www.hyperledger.org/). As another example, the ledger of assertions may be a permissioned ledger. A permissioned ledger is a ledger based on a permissioned blockchain model, wherein preapproved, well-defined entities may participate in a decentralized manner. Alternatively, or additionally, the assertions may be stored to a central database (e.g., maintained by the assertion server computer 131).

As described above, the assertions stored to the ledger of assertions 141 may refer to a secure fact about an entity. An assertion can protect information while being useful to achieve a particular goal. For example, an assertion may specify that a user 111a has a mobile network account in good standing. The assertions may not include personally identifiable information about the user 111a. For example, the assertion may indicate that user 111a is over eighteen years of age, without specifying the actual age or date of birth of the user 111a. Accordingly, the assertions can be used to protect user privacy.

The event log 151 can be stored in any suitable computer-readable storage medium and/or any suitable combination of computer-readable storage media. For example, the event log 151 can be stored in a database. Additionally or alternatively, the event log 151 can be maintained and stored in a distributed ledger, including but not limited to a blockchain and/or the like.

The event log 151 may store data characterizing events. Examples of events include the user making a payment (e.g., for a mobile phone, utility, etc.), failing to make a payment, keeping a bank account in good standing for a particular time period, overdrawing a bank account, etc. Examples of event data structures, as well as further detail about events and assertions, can be found in U.S. patent application Ser. No. 16/193,848, assigned to the same assignee as the present application and incorporated by reference herein in its entirety.

The event log 151 may be used to access event metadata for tasks such as dispute resolution, fraud detection, and/or analysis of user behaviors. By restricting access to the cryptographic keys needed to access one or more events, the event structure helps to keep data associated with user 111a private. For example, a private key held by user 111a may be required to access event data, ensuring that event data is only available with explicit permission from user 111a. Access paths to the event data may be defined via a common Application Programming Interface (API) structure. The access paths may be established such that limited entities may access the events with limited amounts of data.

The system 100 may further include a key locker 171. The key locker 171 may be a be a file, a collection of files, or a database for storing cryptographic keys. The key locker 171 may be cloud-based. The key locker 171 may store cryptographic keys assigned to various entities (e.g., a cryptographic key assigned to a user 111a, a trusted entity computer 121, a relying entity computer 161, etc.). The key locker 171 may organize the keys based on user 111a, such that the keys of parties that have been involved in events in association with a user 111a are stored in a structure based on that user 111a. This set of keys may be encrypted using a key of the user 111a, such that a private key held by the user 111a is required to release the set of keys. Alternatively, or additionally, a pairwise key set may be assigned for each relationship. As an example, a pairwise key set may be assigned for the user 11a and the relying entity computer 161. The key locker 171 may store cryptographic keys that have been associated with prior events involving the user 111a.

In some embodiments, one or more of the keys may encoded based on the Base58 model. Base58 is a type of binary-to-text encoding using fifty-eight easily distinguished alphanumeric symbols and a payload of arbitrary size. Additionally, one or more keys may be encoded in Wallet Import Format (WIF). WIF is a method of encoding a key which facilitates copying the key and allows for compression. Some keys may or may not be encoded and/or encrypted based on the appropriate security level.

Figure 2:
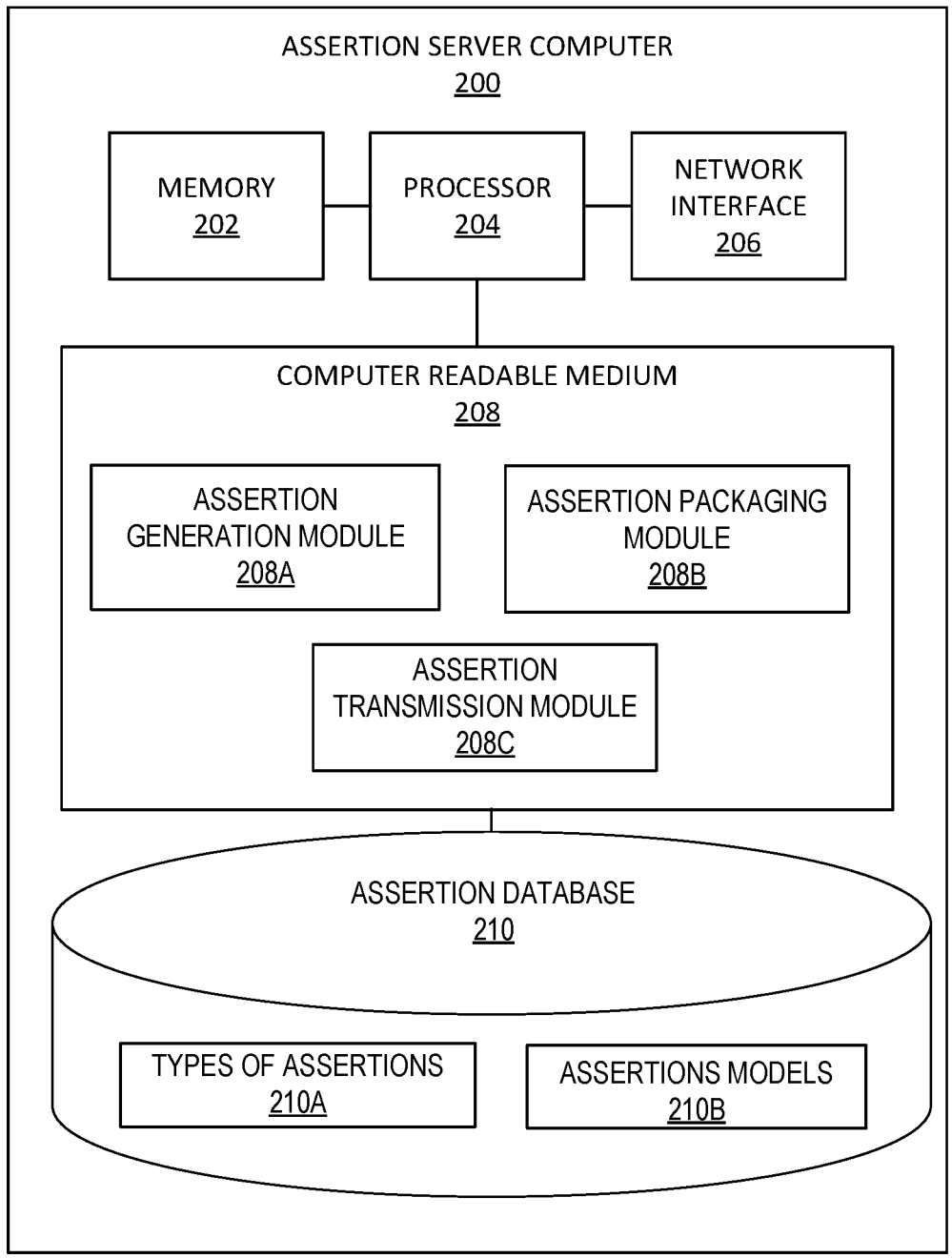
FIG. 2 shows a block diagram of an assertion server computer according to some embodiments.

FIG. 2 shows a block diagram of an assertion server computer 200 according to some embodiments. The assertion server computer 200 may comprise a processor 204. The processor 204 may be coupled to a memory 202, a network interface 206, and a computer-readable medium 208.

The processor 204 may be implemented as one or more integrated circuits (e.g., one or more single core or multicore microprocessors and/or microcontrollers). The processor 204 may be used to control the operation of the assertion server computer 200. The processor 204 can execute a variety of programs in response to program code or computer-readable code stored in memory. The processor 204 may include functionality to maintain multiple concurrently executing programs or processes.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The network interface 206 may include an interface that can allow the assertion server computer 200 to communicate with external computers. Network interface 206 may enable the assertion server computer 200 to communicate data to and from another device (e.g., relying entity computer 161, trusted entity computer 121, etc.). Some examples of network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 206 may include Wi-Fi™. Data transferred via network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium. The network interface 206 can utilize a long range communication channel as well as a short range communication channel.

The assertion database 210 may be a storage unit and/or device (e.g., a file system, database, collection of tables, or other storage mechanism) for storing data. The assertion database 210 may include multiple different storage units and/or devices. The assertion database 210 may store types of assertions 210A and assertions models 210B.

In some embodiments, a type of assertion 210A is a category of assertions, e.g., whether an entity has at least $100 in a bank account. The "assertion" or "assertion value" associated with the type of assertion may be a corresponding answer for a particular user, which may in the form of "yes" or "no," or may be an affirmative statement (e.g., "Jane Doe has $100 or more in her bank account.").

In some embodiments, an assertions model 210B specifies one or more types of assertions 210A. An assertions model 210B may include several types of assertions 210A. For example, a particular assertions model 210B may include three types of assertions 210A—whether a user has a mobile phone account, whether the user has a payment service tied to the mobile phone account, and whether the user is a citizen of Nigeria. In some embodiments, an assertions model 210B may include raw user data in addition to the types of assertions 210A. For example, a particular assertions model 2106 may include: (1) whether a user is a resident of Texas (a type of assertion), (2) whether a user is at least 18 years of age (a type of assertion), and (3) the user's name (user data). If the assertions model 2106 include use of raw user data, increased security measures may be implemented. For example, access to user data may be restricted using a cryptographically secure link that goes out of scope after a certain amount of time or under certain conditions.

The computer-readable medium 208 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

The computer-readable medium 208 may comprise software code stored as a series of instructions or commands. The computer-readable medium 208 may comprise code, executable by the processor 204, to implement a method comprising: receiving, by a server computer from a trusted entity computer, user data corresponding to a user; based on the user data, determining, by the server computer, a set of assertions for the user; receiving, by the server computer from a relying entity, an assertion request for the user; and responsive to the assertion request, providing, by the server computer to the relying entity, an assertion, of the set of assertions, wherein the relying entity thereby grants the user a particular type of account based on the assertion.

The computer-readable medium 208 may include an assertion generation module 208A, an assertion packaging module 208B, and an assertion transmission module 208C. Each of these modules may include code configured to perform the functions described below in conjunction with the processor 204.

The assertion generation module 208A may comprise code that causes the processor 204 to create and update assertions. The assertion generation module 208A may use an assertions model 210B, and/or information specified by the relying entity computer 161, to identify one or more types of user data corresponding to a particular type of assertion. For example, the assertion generation module 208A generates an assertion whether a particular user has a checking account in good standing. The assertion generation module 208A may determine, e.g., using a look-up table or mapping, that the corresponding types of user data are types of accounts held by the user and account standing of the user. The assertion generation module 208A may retrieve the corresponding user data from, e.g., one or more trusted entities. The assertion generation module 208A may compute an assertion value, based on the retrieved identity attribute data.

In some embodiments, the assertion packaging module 208B includes software and/or hardware configured to generate package one or more assertions for providing to a relying entity. A package of assertions may correspond to a plurality of assertions grouped together in a targeted fashion (e.g., for a particular relying entity 161 or type of relying entity). Alternatively, a single assertion may be formatted for providing to a relying entity (e.g., as illustrated in FIG. 6). The assertion packaging module 208B may generate a package of assertions by collecting the necessary underlying assertions and/or supporting data. The assertion packaging module 208B may convert the assertions and/or supporting data into an appropriate format. The assertion packaging module 208B may further encrypt and/or digitally sign the package of assertions and/or underlying assertions.

In some embodiments, a package of assertions may be formatted as a "clustered" assertion, where a plurality of underlying assertions are used to generate a single assertion computed based on the underlying assertions. In this case, the assertion packaging module 208B may further compute the clustered assertion based on the underlying assertions. For example, a clustered assertion may indicate that a user is eligible to be granted a mid-level checking account if the user (a) has an entry-level checking account in good standing and (b) has been paying bills to a mobile network operator on time for at least six months.

In some embodiments, the assertion transmission module 208C may transmit packages of assertions and/or information about the packages of assertions. The assertion transmission module 208C may include one or more application programming interfaces (APIs) for sending/receiving data.

In some embodiments, the assertion transmission module 208C may transmit the package of assertions directly to the relying entity computer 161 (e.g., by a message). Alternatively, or additionally, the assertion transmission module 208C may write assertion data corresponding to the package of assertions to the ledger of assertions 141 and/or event log 151, as described above with respect to FIG. 1.

Figure 3:
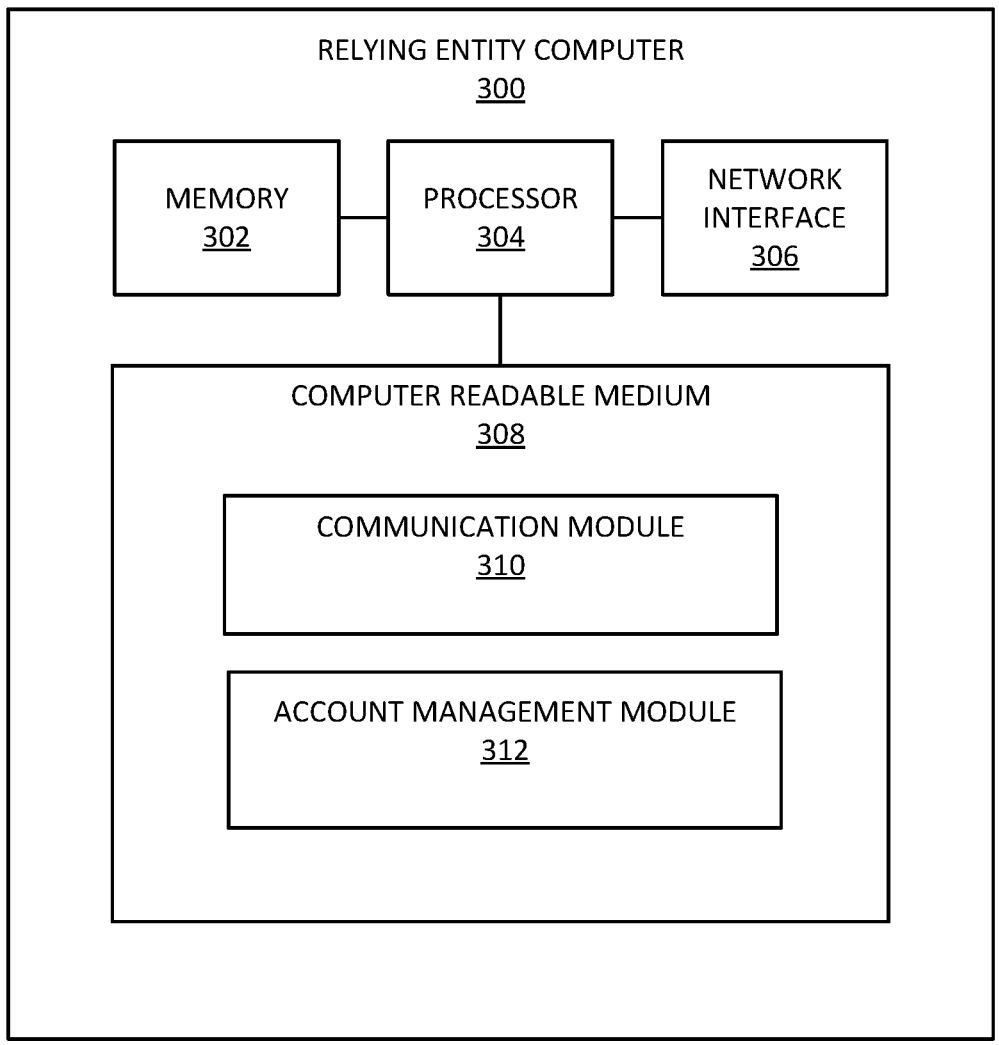
FIG. 3 shows a block diagram of a relying entity computer according to some embodiments.

FIG. 3 shows a block diagram of a relying entity computer 300 according to some embodiments. The relying entity computer 300 may include a processor 304. The processor 304 may be coupled to a memory 302, a network interface 306, and a computer-readable medium 308.

The memory 302, processor 304, and network interface 306 may be substantially similar to the memory 202, processor 204, and network interface 306, as described above with respect to FIG. 2.

The computer-readable medium 308 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

The computer-readable medium 308 may comprise software code stored as a series of instructions or commands. The computer-readable medium 308 may comprise code, executable by the processor 304, to implement a method comprising: receiving, by a relying entity computer from a user, a request for a particular type of account; transmitting, by the relying entity computer to a server computer, an assertion request for the user; receiving, by the relying entity computer from the server computer, an assertion, wherein the assertion is based on user data corresponding to the user; and granting, by the relying entity computer to the user, the particular type of account based on the received assertion.

The computer-readable medium 308 may include a communication module 310 and an account management module 312. Each of these modules may include code configured to perform the functions described below in conjunction with the processor 304.

The communication module 310 may comprise code that causes the processor 304 to generate messages, forward messages, reformat messages, and/or otherwise communicate with other entities.

The account management module 312 may comprise code that causes the processor 304 to determine whether to grant or refuse a particular type of account to a user. The account management module 312 may evaluate requests to open accounts from users. The account management module may prepare assertion requests corresponding to such requests to open accounts. The account management module 312 may evaluate assertions received in response to assertion requests, to determine whether to grant or refuse a particular type of account.

In some embodiments, the account management module 312 may comprise code that causes the processor 304 to manage accounts based on graduated levels (e.g., stepwise KYC tiers that can be used to create or build credit history). For example, the tiers may be:

1) MNO leverage—MNO payment account for microtransactions.
2) Entry account—account with restrictions such as spending limits or number of transactions per day.
3) Full account—account with fewer restrictions than the entry account.
4) Credit/financial services—loans, credit cards, etc.

In some embodiments, the account management module 312 may include logic to identify account eligibility for a user (e.g., whether a user should be granted or refused a particular type of account) based upon graduated account levels. In some cases, account eligibility for a user may be based directly upon an assertion (e.g., the assertion is that the user is a good candidate for an entry-level bank account). In some cases, account level eligibility may be determined based upon an assertion and other information (e.g., an assertion that the user has an MNO account, along with income data provided to the relying entity computer 300 by the user). Alternatively, or additionally, account level eligibility may be determined based upon a current account level for the user (e.g., if a user has an MNO account, then the user can be considered for an entry-level checking account).

Figure 4:
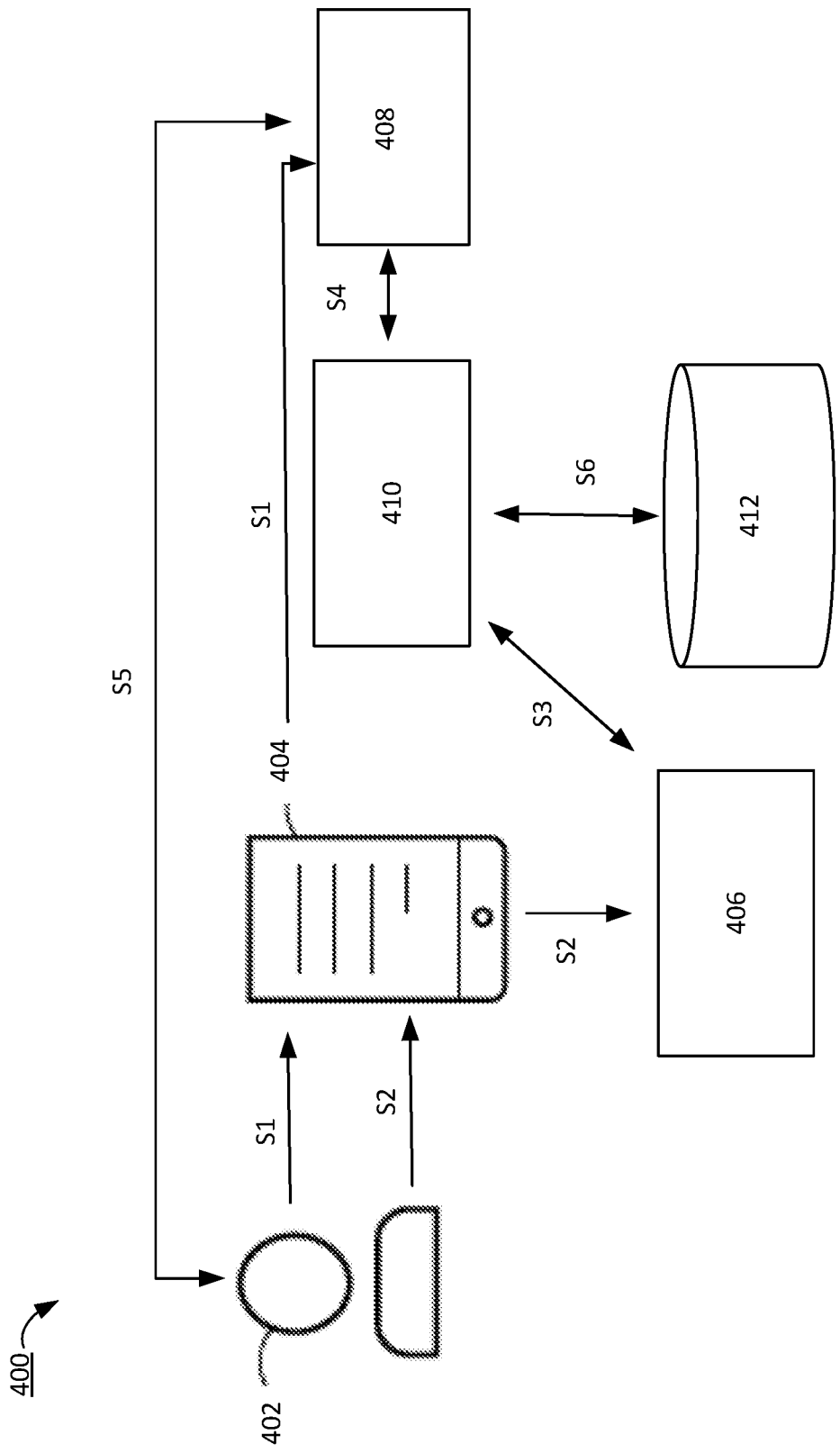
FIG. 4 shows a schematic diagram of a system and method for managing graduated accounts using assertions according to some embodiments.

FIG. 4 shows a schematic diagram of a method 400 according to some embodiments. The method 400 may be performed by a user 402 via a user device 404 in communication with a trusted entity computer 406, relying entity computer 408, and server computer 410. The user 402, user device 404, trusted entity computer 406, relying entity computer 408, and server computer may be substantially similar to the user 111a, user device 111b, trusted entity computer 121, relying entity computer 161, and assertion server computer 131 of FIG. 1, respectively.

At step S1, the user 402 requests an account. The user 402 may request to open a particular type of account. The user may, for example, request, to the relying entity computer 408, to open a bank account, a loan account, a transit pass account, and so forth. The user may request the account via a Webpage or application, e.g., by entering data into the user device 404 and submitting the data over a network. Alternatively, or additionally, the request for the account may be in-person. For example, user 402 may go into a bank and ask a teller to open up a line of credit.

At step S2, the user 402 consents to sharing user data. Initially, the user 402 may be presented with a request to share the user data. In some embodiments, the relying entity computer 408 may transmit a request to the user device 404 such as "Consent requested—May we create a digital identity and capture future transaction events?". In some embodiments, the trusted entity computer 406, at some initial time, transmits a request to the user device 404 such as "can we share your data?".

The user may consent to the sharing of the data via the user device 404 or via an in-person interaction. The user 402 may, for example, interact with interface elements via user device 404 which cause transmission of a consent message. As another example, the user 402 may provide consent verbally or by singing a form.

At step S3, based on receiving an indication of assent to user data access from the user, the system may collect and store user data corresponding to the user. The user data may include data gathered from one or more sources. The user data may include data from a MNO. Alternatively, or additionally, user data may be collected from various other entities, such as utility companies, merchants, government entities, etc.

In some embodiments, the assertion server computer uses the user data to build an event history for the user. The assertion server computer may store data characterizing events (such as MNO transactions) to the event database 412. These events can, in some cases, be used to build a history for an unbanked person.

In some embodiments, the user data may be used to generate assertions for the user. For example, the user data may specify that the user has paid her phone bill on-time for two consecutive years, along with details about how the user paid. The assertion server computer may generate and store an assertion which specifies that the user has on-time phone payment history for at least a year. In some embodiments, the assertion may be stored without storing raw user data, such that the necessary information may be stored while maintaining user privacy by refraining from storing additional details which could be sensitive.

In some embodiments, a generated assertion corresponds to a graduated account level. Based on the user data collected, a first account level may be determined for the user. For example, the first account level may be determined for the user based on a package of assertions which specifies that the user (a) has a mobile phone account in good standing and (b) has not been convicted of consumer fraud. The first account level may correspond to a "lower" level of account. As an example, the first account level may correspond to being allowed to open a bank account, but with a $100 dollar daily spending limit. The second account level may correspond to a higher level of account, e.g., with a $1,000 dollar daily spending limit, and so forth.

At step S4, the relying entity computer obtains assertions, user data, and/or events from the assertions server computer and uses the obtained information to determine whether to grant the requested account type to the user. The relying entity computer may, for example, determine whether to grant an account of a particular type to a user based on an assertion that specifies the account level for the user. Alternatively, or additionally, the relying entity computer may obtain assertions from the assertion server computer that relate to criteria for granting a particular type of account. For example, the user has requested to open a bank account, and the assertion server computer provides an assertion that the user has been conducting financial transactions via an MNO for the last year. Alternatively, or additionally, the assertion server computer may allow the relying entity computer to view event logs, which may inform the relying entity computer about transactions conducted between the user and an MNO or other entity.

At step S5, the relying entity computer grants or refuses an account based on the assertions and/or other information provided by the assertion server computer. For example, upon determining that the user is eligible to open a bank account with a $100 daily spending limit, the relying entity grants the account to the user. Granting an account to a user may include initiating the process of opening a bank account for the user with a $100 daily spending limit. Granting an account may further involve establishing an account number for the user, distributing items to the user (e.g., a debit card or an access card to get into a building), etc. If the user has requested a type of account for which criteria have not been met, then the relying entity computer refuses the account to the user. Refusing an account to a user may include refraining from opening a new account or extending additional credit to the user, etc.

At step S6, The system may periodically update the stored user data as additional user data is acquired. The user data may be stored as, or used to generate, events in event log 412. For example, as the user continues to conduct transactions, the assertion server computer stores event data corresponding to the transactions to the event log 412. The assertion server computer may further update the assertions for the user as additional user data is acquired.

Figure 5:
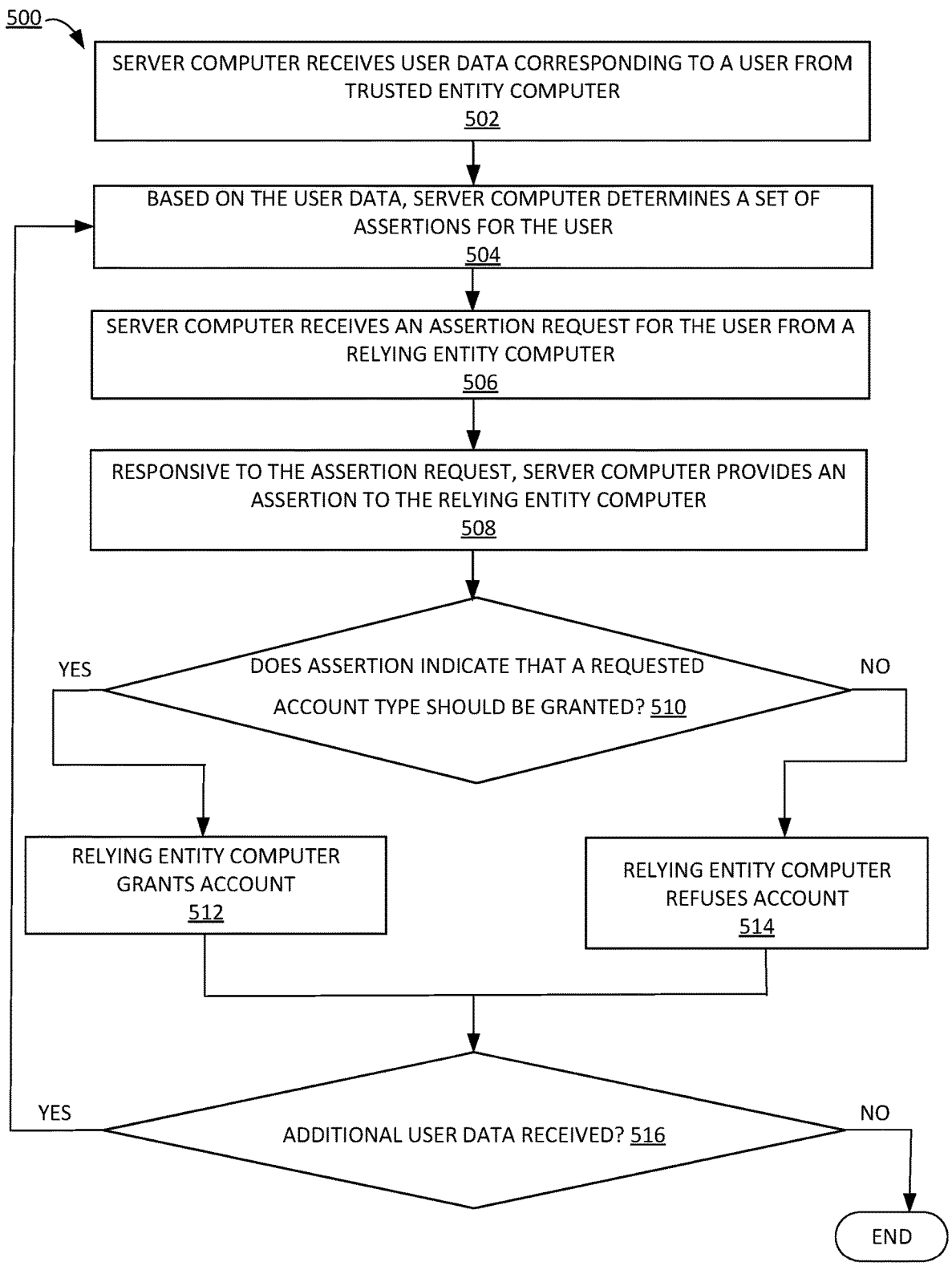
FIG. 5 shows a flow chart of techniques for managing graduated accounts using assertions according to some embodiments.

FIG. 5 shows a flow chart of a method 500 for graduated account management using assertions according to some embodiments. The operations of FIG. 5 may be performed by the systems described above with respect to FIGS. 1-3, and in particular, the assertion server computer (server computer) and relying entity computer.

As described above with respect to FIG. 4, initially (e.g., prior to transmitting user data to the server computer) the trusted entity computer may receive user permission to share the user data responsive to a request to share the user data. A trusted entity such as a mobile network operator may receive user permission to gather and share user data, which may include data characterizing transactions entered into by the user, personally identifiable information about the user, and so forth. The trusted entity computer may gather such information and share it with the server computer.

At step 502, the server computer receives user data corresponding to a user from the trusted entity computer. The server computer may receive the user data in a message, through access to a shared database, via an API, and/or the like. In some embodiments, the server computer may store the user data to the event log. At step 504, the server computer determines a set of assertions for the user based on the user data received at step 502. The server computer may determine an assertion by determining whether something is true or false based on the user data. The server computer may, for example, use an equation or algorithm to compute a value of an assertion based on the user data. As a specific example, the assertions management module may generate an assertion: whether the user has made payments to a mobile phone account on time for at least six months. The server computer identifies the corresponding user data—a set of payment records for the user's mobile phone account—and uses the identified user data to compute the assertion value. As another example, the server computer may determine an assertion value specifying whether the is user is old enough to open a particular account that requires account holders to be eighteen or older. The server computer calculates the assertion value based on a verified date of birth provided by the trusted entity computer using the following algorithm:

{"OfAgeForAccount"::="Yes" iff "Current date"–"Verified date of birth"≥18 years else "No"} where "OfAgeForAccount" is the assertion value specifying whether the user is old enough to open the account, "Yes" is the value if the user is old enough, "No" is the value if the user is not old enough, "Current date" is the date on which the calculation is made, and "Verified date of birth" is the date of birth of the user as provided by trusted entity verification of the source of the date of birth.

In some embodiments, the server computer may identify a set of assertions, and corresponding user data for generating the set of assertions, using a stored assertions model. For example, the server computer may retrieve the assertions model from the assertion database. The server computer may identify a set of types of assertions corresponding to the assertions model. For example, the server computer may determine that the assertions model includes three types of assertions: whether the target entity is at least 18 years of age, whether the target entity has made on-time payments for at least three months, and whether the target entity has a valid payment instrument. The assertions model manager may identify the types of assertions by analyzing the assertions model. Based on such an identified assertions model, the server computer may, in turn, determine the value of each assertion therein.

At step 506, the server computer receives an assertion request for the user from a relying entity computer. The assertion request may be for one or more assertions (e.g., a single assertion, a package of assertions, or a clustered assertion). As an example, the relying entity, a bank, may request an assertion whether a particular user has on-time payment history, a particular threshold age, or both.

At step 508, responsive to the assertion request, the server computer provides an assertion to the relying entity computer. The server computer may provide one or more assertions, corresponding to the assertion request, to the relying entity computer. The assertion may directly or indirectly specify whether a particular type of account should be granted to a particular user. For example, the server computer may transmit a clustered assertion "EligibleForStarterAccount" which is a single yes/no assertion whether the user is (a) a citizen of Kenya, (b) has a valid mobile payment account and (c) the mobile payment account is in good standing. If the answer to all three questions is yes, the assertion value is true, and the user is eligible for a starter account. Accordingly, in some embodiments, the provided assertion specifies the particular type of account (e.g., "starter account"). As another example, the transmitted assertion may specify whether or not the user is between the ages of 16 and 29, which is a requirement for opening a College Checking account. In this case, the relying entity may indirectly use the assertion to identify the type of account to grant, based on the assertion and additional information.

The server computer may provide the assertion to the relying entity by transmitting the assertion to the relying entity computer over a network (e.g., via a message and/or API push). Alternatively, or additionally, the server computer may provide the assertion to the relying entity by writing the assertion to an entry on the ledger of assertions and permitting the relying entity access to the entry. The relying entity computer may then receive the assertion(s).

At step 510, the relying entity computer determines whether a requested account type should be granted. As described above with respect to FIG. 4, prior to step 510, a user may request a particular type of account from the relying entity, triggering the relying entity computer to request assertions and evaluate whether the account should be granted to the user.

The relying entity computer may determine whether the particular type of account should be granted directly or indirectly based on the provided assertion. For example, if the assertion is that the user is eligible for a Level 2 checking account, the relying entity computer may determine that the user is eligible for a Level 2 checking account directly based upon the assertion. As another example, if the assertion is that the user is between 16 and 29, a requirement for a College Checking account, then the relying entity computer may determine that the user is eligible for the College Checking account indirectly based on the assertion, potentially while considering other factors such as entries in an account application provided by the user. If a received assertion indicates that the user does not meet a requirement for an account, then the relying entity computer may determine that the assertion indicates that a requested account type should not be granted.

At step 512, if the assertion indicates that the requested particular account type should be granted, then the relying entity computer grants the user the particular type of account. The relying entity computer may grant an account by initiating an account of the requested type. This may include transmitting a message that the account is granted and/or opening the account.

At step 514, if the assertion indicates that the requested particular account type should not be granted, then the relying entity computer refuses the user the particular type of account. Upon receiving an assertion indicating that conditions are not met and/or that the account type should not be granted, the relying entity thereby refuses the user the account based on the assertion. The relying entity computer may refuse an account, for example, by transmitting a notification that the account is refused, by setting a flag to "denied," and/or by refraining from opening the account.

Alternatively, or additionally, if the assertion indicates that the requested account type should not be granted, then the relying entity computer may offer the user a different type of account. For example, although the user is not eligible for a requested tier 2 account, the relying entity may determine that the user is eligible for a tier 1 account and offer and/or grant the tier 1 account to the user.

At step 516, the server computer determines whether additional user data is received. Additional user data may be received, for example, when the trusted entity computer receives updated user data and shares the updated user data with the server computer. As a specific example, the trusted entity computer manages a mobile payment account for the user, and updates the user data to reflect payment transactions conducted by the user.

If the server computer receives additional user data, then the flow may return to step 504. The server computer may update the assertions to reflect the updated user data. As an example, based on initial user data indicating that the user has five months of history with the trusted entity, the server computer may have stored an assertion that the user does not have six months of history with the trusted entity. Upon receiving updated user data indicating six months of history, the server computer modifies the assertion to generate an updated assertion that the user has six months of history with the trusted entity. Alternatively, or additionally, the server computer may generate and store additional assertions based on the additional user data.

After updating an assertion, the server computer may receive a second assertion request from the relying entity. The server computer may, in response, provide the updated assertion to the relying entity. Based on the updated assertion, the relying entity may grant a type of account to the user which the user was not previously granted. For example, at the first account level, the user could only spend $100 a day with his bank account. The user is now at a second account level, at which the daily spending limit is increased to $500.

As a specific example, steps 502-512 are performed, wherein the user data is first user data, the assertion request is a first assertion request, and the particular type of account is a first type of account. The server computer then receives second user data corresponding to the user by the server computer from the trusted entity computer. For example, the server computer receives updated information indicating that the user paid off a medical debt. Based on the second user data, the server computer updates the set of assertions for the user to generate an updated set of assertions for the user. For example, the server computer updates an assertion to indicate that the user does not have medical debt. The server computer receives a second assertion request for the user from the relying entity. The relying entity may request assertions for granting a second type of account. The first type of account may be subject to more restrictions than the second type of account (e.g., the user is applying for a second type of checking account that has a $1,000 daily spending limit, in contrast to a first type of account that has a more highly restricted $100 daily spending limit). Responsive to the second assertion request, the server computer provides an updated assertion, of the updated set of assertions. For example, the server computer may send an assertion indicating that the user has no medical debt and/or an assertion indicating that the user is eligible for a level 2 checking account. The relying entity thereby grants the user a second type of account based on the updated assertion. For example, the relying entity may use the updated assertion to determine to upgrade the user's checking account to one with fewer restrictions, or to open an additional account for the user, based on the updated assertion.

Figure 8:

FIGS. 6-8 illustrate examples of information that may be included with assertions (e.g., in a data package), according to non-limiting embodiments.

FIG. 6 illustrates an example of information 600 that may be included with an assertion. This may include the name (Assertion Name), identifier (Assertion ID), type (Assertion Type), and date scope (Assertion Date Scope) for the assertion. The date scope may reference the start date, end date (e.g., expiration date), and/or half-life associated with that assertion. For example, an assertion may be made based on a driver's license that expires in a week, which means that the assertion would only be valid for a week.

In some embodiments, the information may include a value for the assertion (Assertion Value). The information may also include the source document used for that particular assertion (Assertion Source), the calculated strength score associated with that particular assertion (Assertion Strength score), a signature associated with the individual associated with that particular assertion (Assertion Entity signature), a signature associated with the trusted authority signing that particular assertion (Assertion Trusted Authority ID), a digital signature of the entity providing the particular assertion (Assertion Updater ID), and an identifier of the assertions model used when making that particular assertion (Assertion Model ID). This information, such as the assertions model ID, is listed for each assertion because a particular assertion may have been made and stored prior to this particular relying entity's request. It is possible that all the assertions used to generate the clustered assertion were made at different times. Keeping track of this information in the data package allows the data package to serve as a complete record, such as to identify the assertions model used when any particular assertion was made.

As illustrated in FIG. 7, a data package for a package of assertions may include a set of information 700 that is applicable to all the underlying assertions used to generate the package of assertions. This may include identifiers (Assertions model ID), names (Assertions model Name), descriptors (Assertions model Descriptor), and dates (Assertions model Date) associated with the particular assertions model that was used (e.g., the one referenced based on the relying entity's identifier). This may also include identifiers of the trusted authority signing all of the assertions which may include the assertions model manager (Assertion Trusted Authority ID), identifiers of the entities making the underlying assertions which may include the assertions model manager (Assertion Updater ID), the sources of data or identity attribute(s) used to make the underlying assertions (Assertion Valid Sources), and a description or Uniform Resource Locator (URL) for the algorithm used to score the underlying assertions (Assertion Scoring Link).

FIG. 8 illustrates an example of information 800 that may be provided in a data package for a clustered assertion. This information may include a name or descriptor of the data package (Package Name), an identifier of the data package (Package ID) which includes an index number that allows the data package to be referenced in a database or distributed ledger, and a date scope associated with the data package or package of assertions assertion (Package Date Scope).

The package date scope may inform of a start and end date (e.g., expiration date) associated with the assertion. For instance, a relying entity may receive a clustered assertion but desire to know how long that clustered assertion is valid for (e.g., valid for a week, valid for three months, and so forth). In some embodiments, a package of assertions may have a date scope that corresponds to the underlying assertion with the most-restrictive date scope (e.g., the earliest expiration date among the underlying assertions). For example, a particular package of assertions, which is a clustered assertion, may be a calculated result based on three underlying assertions. One of the three assertions may be based on a valid driver's license on file, with that license expiring next week. The other two assertions may be based on information that is valid for another year. However, since this clustered assertion is determined based on all three assertions, this clustered assertion would also have a date scope of a week (e.g., it would expire next week) because it would no longer be valid once the driver's license expires.

The data package may also include a name or descriptor of the package of assertions (Assertion Name) and a strength score associated with the package of assertions (Assertion Strength score). The data package may also reference a particular assertions model (Assertions model ID) used to generate the package of assertions and also describe the underlying assertions supported in the assertions model (not shown in FIG. 12). For instance, the data package may list the assertions in the model: TAAffirmEnty, EntyValidStatedDoc, EntyPrivacyJuris, EntyTATenureGE, TARawDataTfr, EntyAgeGE, EntyVfyDepAcct, EntyPmtTok, EntyEdCert, and EntyMember. Thus, if the assertions model changes, then it can be determined that all underlying assertions based on the older assertions model will need to be updated.

Embodiments provide several advantages. Through the use of secure assertions, user privacy can be preserved. The techniques described herein further provide a simpler and more efficient way for a relying entity to gather the necessary information for determining whether to grant a particular account to a user. The relying entity need not seek out user data from disparate sources, as the information is available in a central, secure, and trusted framework. The relying entity can simply be given assertions derived from user data that are easy to digest and use for determining whether to grant an account to the user. This reduces the computations and network messaging required to build a KYC profile of a user. Further, the system can be used to increase the availability of accounts resources to users with limited history. By granting a user accounts in a stepwise fashion, the user can be given gradual entry into full account access in a streamlined manner.

Further, the assertions may be stored as entries to a distributed ledger. Using a distributed ledger approach for the assertions provides numerous advantages. The assertion data is provable, in that entries can be attributable to specific entities cryptographically. The assertion data is non-repudiable, in that entries cannot later be altered or deleted. The assertion data is sequential, as the order of every entry is provable before, or after, every other entry. The assertion data is ubiquitous and available from any reasonable vector. The assertion data is survivable, even if large numbers of the distributed nodes fail or are under attack. The data is highly available, with high throughput. The assertion data is trustable by the entities involved.

Further, it is advantageous to generate an assertion which answers the relying entity's question on a need-to-know basis, in order to ensure privacy. For example, the system can inform the relying entity that the target entity is old enough to buy liquor without revealing the target entity's actual age, or any other information that may be revealed on a driver's license, such as the target entity's name or address. This can be taken a step further by using a clustered assertion which is based on multiple underlying assertions. For example, the relying entity may be informed that the target entity should not be granted access to a building, without revealing the answer to any of the underlying assertions used to make that determination (e.g., whether the target entity is an employee, whether the target entity has a valid security clearance, and whether the target entity is staffed on a project corresponding to the location). Accordingly, the teachings of the present disclosure Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a server computer from a trusted entity computer, user data corresponding to a user;
   based on the user data, determining, by the server computer, a set of assertions for the user, the set of assertions comprising a plurality of secure facts about the user that specify information about the user while protecting personal information, where an assertion of the set of assertions is related to an account history of the user, and wherein the assertions do not include personally identifiable information about the user;
   receiving, by the server computer from a relying entity, an assertion request for the user; and
   responsive to the assertion request, providing, by the server computer to the relying entity, the assertion, of the set of assertions, related to the account history of the user, wherein the provided assertion uniquely specifies a particular type of new account of an account level of a plurality of account levels, and wherein the relying entity thereby grants the user the particular type of new account based on the assertion, wherein the user data is first user data, the assertion request is a first assertion request, and the particular type of new account is a first type of new account, the method further comprising:
   receiving, by the server computer from the trusted entity computer, second user data corresponding to the user;
   based on the second user data, updating, by the server computer, the set of assertions for the user to generate an updated set of assertions for the user;
   receiving, by the server computer from the relying entity, a second assertion request for the user; and
   responsive to the second assertion request, providing, by the server computer, an updated assertion, of the updated set of assertions, wherein the updated set of assertions includes an assertion that uniquely specifies a second type of new account, wherein the second type of new account has a higher account level than the first type of new account, and wherein the relying entity thereby grants the user the second type of new account based on the updated assertion.

2. The method of claim 1, wherein the first type of new account is subject to more restrictions than the second type of new account.

3. The method of claim 1, wherein:
   prior to transmitting the user data to the server computer, the trusted entity computer receives user permission to share the user data responsive to a request to share the user data.

4. The method of claim 1, further comprising:
   receiving, by the server computer from the relying entity, a third assertion request for the user; and
   responsive to the third assertion request, providing, by the server computer, the assertion, wherein the relying entity thereby refuses the user a third type of new account based on the assertion.

5. A server computer comprising:
   a processor; and
   a non-transitory computer readable medium, operatively coupled to the processor, for performing a method comprising:
   receiving, from a trusted entity computer, user data corresponding to a user;
   based on the user data, determining a set of assertions for the user, the set of assertions comprising a plurality of secure facts about the user that specify information about the user while protecting personal information, where an assertion of the set of assertions is related to an account history of the user, and wherein the assertions do not include personally identifiable information about the user;
   receiving, from a relying entity, an assertion request for the user; and responsive to the assertion request, providing, to the relying entity, the assertion, of the set of assertions, related to the account history of the user, wherein the provided assertion uniquely specifies a particular type of new account of an account level of a plurality of account levels, and wherein the relying entity thereby grants the user the particular type of new account based on the assertion, wherein the user data is first user data, the assertion request is a first assertion request, and the particular type of new account is a first type of new account, the method further comprising:

receiving, by the server computer from the trusted entity computer, second user data corresponding to the user;

based on the second user data, updating, by the server computer, the set of assertions for the user to generate an updated set of assertions for the user;

receiving, by the server computer from the relying entity, a second assertion request for the user; and responsive to the second assertion request, providing, by the server computer, an updated assertion, of the updated set of assertions, wherein the updated set of assertions includes an assertion that uniquely specifies a second type of new account, wherein the second type of new account has a higher account level than the first type of new account, and wherein the relying entity thereby grants the user the second type of new account based on the updated assertion.

6. The server computer of claim 5, wherein the first type of new account is subject to more restrictions than the second type of new account.

7. The server computer of claim 5, wherein:
prior to transmitting the user data to the server computer, the trusted entity computer receives user permission to share the user data responsive to a request to share the user data.

8. The server computer of claim 5, the method further comprising:
receiving, from the relying entity, a third assertion request for the user; and
responsive to the third assertion request, providing the assertion, wherein the relying entity thereby refuses the user a third type of new account based on the assertion.

9. A method comprising:
receiving, by a relying entity computer from a user, a request for a particular type of new account;
transmitting, by the relying entity computer to a server computer, an assertion request for the user;
receiving, by the relying entity computer from the server computer, an assertion, wherein the assertion is based on user data corresponding to the user and comprises a secure fact about the user that specifies information about the user while protecting personal information and is related to an account history of the user, wherein the assertions do not include personally identifiable information about the user, wherein the assertion uniquely specifies the particular type of new account of an account level of a plurality of account levels; and
granting, by the relying entity computer to the user, the particular type of new account based on the received assertion, wherein the user data is first user data, the assertion request is a first assertion request, and the particular type of new account is a first type of new account, the method further comprising:
transmitting, by the relying entity computer to the server computer, a second assertion request for the user;
responsive to the second assertion request, receiving, by relying entity computer from the server computer, an updated assertion, of an updated set of assertions; and
granting, by the relying entity computer to the user, a second type of new account based on the updated assertion, wherein the second type of new account has a higher account level than the first type of new account.

10. The method of claim 9, wherein the first type of new account is subject to more restrictions than the second type of new account.

11. The method of claim 9, the method further comprising:
transmitting, by the relying entity computer to the server computer, a third assertion request for the user;
responsive to the third assertion request, receiving, by relying entity computer from the server computer, the assertion; and
refusing, by the relying entity computer to the user, a third type of new account based on the assertion.

* * * * *